United States Patent
Lay et al.

(10) Patent No.: US 9,576,356 B2
(45) Date of Patent: Feb. 21, 2017

(54) REGION CLUSTERING FOREST FOR ANALYZING MEDICAL IMAGING DATA

(71) Applicant: Siemens Healthcare GmbH, Erlangen (DE)

(72) Inventors: Nathan Lay, Plainsboro, NJ (US); Dong Yang, Edison, NJ (US); David Liu, Franklin Park, NJ (US); Shaohua Kevin Zhou, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 14/707,418

(22) Filed: May 8, 2015

(65) Prior Publication Data
US 2016/0328841 A1    Nov. 10, 2016

(51) Int. Cl.
| G06K 9/00 | (2006.01) |
| G06T 7/00 | (2006.01) |
| G06K 9/62 | (2006.01) |
| G06K 9/46 | (2006.01) |

(52) U.S. Cl.
CPC .............. *G06T 7/0012* (2013.01); *G06K 9/46* (2013.01); *G06K 9/6218* (2013.01); *G06K 9/6256* (2013.01); *G06K 9/6267* (2013.01); *G06K 2009/4666* (2013.01)

(58) Field of Classification Search
None
See application file for complete search history.

(56) References Cited

U.S. PATENT DOCUMENTS

| 6,009,199 | A | 12/1999 | Ho | |
| 8,184,888 | B2* | 5/2012 | Lu | G06T 7/0012 382/131 |
| 8,744,172 | B2 | 6/2014 | Tsymbal et al. | |
| 8,812,431 | B2 | 8/2014 | Voigt et al. | |
| 8,837,771 | B2 | 9/2014 | Lay et al. | |
| 2010/0111396 | A1* | 5/2010 | Boucheron | G06K 9/0014 382/133 |
| 2012/0213302 | A1* | 8/2012 | Walton | H04B 1/71072 375/267 |
| 2015/0087240 | A1* | 3/2015 | Loewke | G06T 7/0016 455/67.11 |
| 2015/0213302 | A1* | 7/2015 | Madabhushi | G06K 9/00147 382/133 |

OTHER PUBLICATIONS

Ren et al (NPL: "Global Refinement of Random Forest", IEEE, Apr. 4, 2015, CVPR2015, hereafter referred to as Ren.).*

* cited by examiner

*Primary Examiner* — Oneal R Mistry (57) ABSTRACT

Systems and methods for training a region clustering forest include receiving a set of medical training images for a population of patients. A set of image patches is extracted from each image in the set of medical training images. A plurality of region clustering trees are generated each minimizing a loss function based on respective randomly selected subsets of the set of image patches to train the region clustering forest. Each of the plurality of region clustering trees cluster image patches at a plurality of leaf nodes and the loss function measures a compactness of the cluster of image patches at each leaf node in each of the plurality of region clustering trees.

25 Claims, 6 Drawing Sheets

REGION CLUSTERING FOREST FOR ANALYZING MEDICAL IMAGING DATA

BACKGROUND OF THE INVENTION

The present invention relates generally to analyzing medical imaging data, and more particularly to region clustering forest for analyzing medical imaging data.

Landmark detection is an important step in many medical image processing and analysis applications. One conventional approach to landmark detection is based on predicting landmarks through hierarchical spatial dependence. Initial seed landmarks are first detected, and from the seed landmarks, another set of landmarks is detected. Another conventional approach to landmark detection employs a type of regression forest to simultaneously predict offsets to several landmarks and then verify the predictions with discriminative models. An important issue in landmark detection is the reduction of computational costs by providing fast and accurate results.

BRIEF SUMMARY OF THE INVENTION

In accordance with an embodiment, systems and methods for training a region clustering forest include receiving a set of medical training images for a population of patients. A set of image patches is extracted from each image in the set of medical training images. A plurality of region clustering trees are generated each minimizing a loss function based on respective randomly selected subsets of the set of image patches to train the region clustering forest. Each of the plurality of region clustering trees cluster image patches at a plurality of leaf nodes and the loss function measures a compactness of the cluster of image patches at each leaf node in each of the plurality of region clustering trees.

In accordance with an embodiment, systems and methods for detecting an anatomical object in medical imaging data of a patient include extracting image patches from the medical imaging data of the patient. The extracted image patches are sorted to leaf nodes of each of a plurality of region clustering trees of a trained region clustering forest. Each of the plurality of region clustering trees is trained to minimize a cost function that measures a compactness of image patches of training data clustered at leaf nodes of the region clustering tree. The anatomical object is detected in the extracted image patches based on the respective leaf nodes that the extracted image patches were sorted to.

These and other advantages of the invention will be apparent to those of ordinary skill in the art by reference to the following detailed description and the accompanying drawings.

DETAILED DESCRIPTION

The present invention generally relates to training a region clustering forest and applying the trained region clustering forest for the analysis of medical imaging data. Embodiments of the present invention are described herein to give a visual understanding of methods for training and applying a region clustering forest. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Further, it should be understood that while the embodiments discussed herein may be discussed with respect to medical imaging data of a patient, the present principles are not so limited. Embodiments of the present invention may be employed for any imaging data and for any application.

A region clustering forest is a collection or ensemble of trained region clustering trees. A trained region clustering forest receives an input vector, which is passed down each region clustering tree of the region clustering forest. Each region clustering tree is comprised of a plurality of nodes (or vertices) in parent-child relationships for a given depth. Each node of the region clustering tree represents a trained classifier for classifying the input vector. The region clustering forest is trained in an offline training stage using a set of annotated training data. The trained region clustering forest may be used to classify the input vector based on a label associated with the most votes from each decision tree. The trained region clustering forest may also be employed for other applications.

Figure 1:
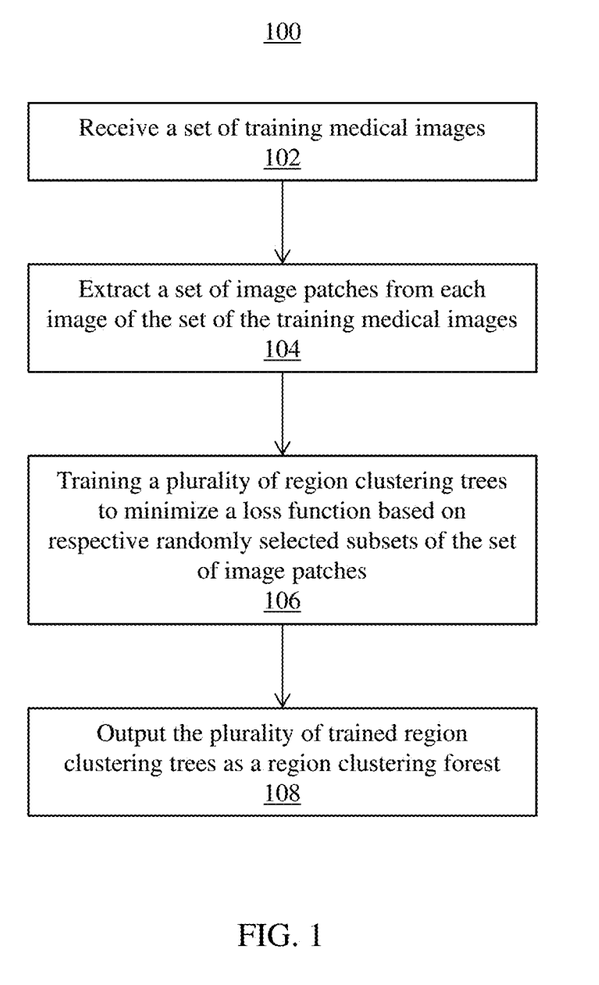
FIG. 1 shows a method for training a region clustering forest in an offline training stage, in accordance with one embodiment.

FIG. 1 shows a method 100 for training a region clustering forest in an offline training stage, in accordance with one or more embodiments. While method 100 of FIG. 1 is described with respect to medical imaging data of a patient, it should be understood that the present invention is not so limited, and embodiments of the present invention may be similarly applied for any imaging data and for any application. Method 100 of FIG. 1 is directed to training a region clustering forest by minimizing a loss function.

Referring to FIG. 1, at step 102, a set of training medical images is received. The set of training medical images may include training data acquired from a population of patients. The population of patients may be patients sharing a same characteristic, a cross-section of different patients, a randomly selected population of patients, etc. The training medical images are annotated, e.g., with known locations of landmarks, with locations of bone structures, or any other annotation. The training medical images may be acquired using an image acquisition device of any modality, such as, e.g., computed tomography (CT), magnetic resonance (MR), ultrasound, x-ray, etc. The training data set may be received by loading a previously stored training data set from a memory or storage of a computer system.

At step 104, a set of image patches is extracted from each image of the set of training medical images. Each image patch Q(x) corresponds to a region of the respective image centered at a voxel x. We also denote the voxel location of a patch Q by x(Q). For example, image patches centered around every n voxels of the respective image may be extracted, where n is any positive integer. For instance, where n=1, image patches centered around every voxel of the respective image is extracted. In another example, image patches may be extracted from the respective image such that the image patches provide complete coverage of the respective image while not overlapping. Any other suitable method for extracting or sampling image patches from an image may also be employed. The image patches may be of any (e.g., predetermined) size or shape. In one embodiment, the extracted image patches are high dimensional feature spaces, such as, e.g., Haar features. Other types of suitable image features may also be employed. The features associated with a patch Q is denoted by $\{f_1(Q)_2 f_2(Q), \ldots, f_K(Q)\}$. In some embodiments, the set of images patches are directly received as the training data by loading previously stored image patches from a memory or storage of a computer system.

At step 106, a plurality of region clustering trees are trained based on respective different (e.g., randomly) selected subsets of the set of image patches. Each of the plurality of region clustering trees may be trained to minimize a cost function representing a measure of how compact the group of image patches corresponding to each lead node is. Based on the respective randomly selected subsets of the set of image patches, each of the plurality of region cluster trees provide for a different approximation of minimization of the cost function.

Figure 2:
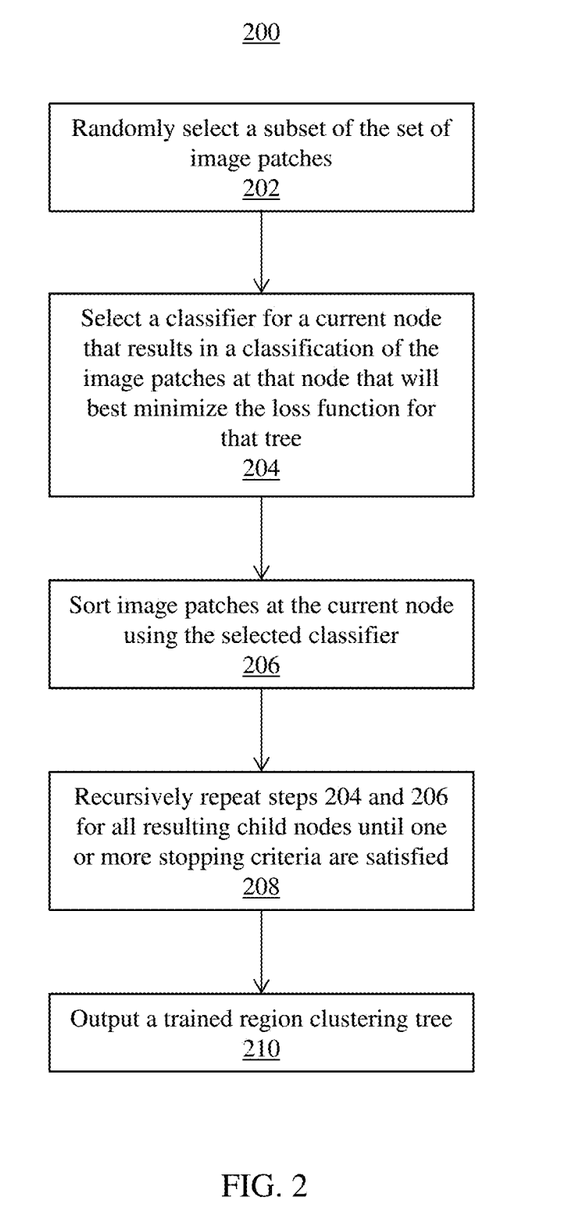
FIG. 2 shows a method for training a region clustering tree of a region clustering forest, in accordance with one embodiment.

FIG. 2 shows a method 200 for training a region clustering tree. Method 200 of FIG. 2 may be repeated to train each of the plurality of region clustering trees to form a region clustering forest. At step 202 of FIG. 2, a subset of the set of image patches is randomly selected. The subset includes less than all of the image patches from the set of images patches. Assuming that there are V training images from which the image patches are extracted, the set of patches extracted from the same training image v is denoted by P[v].

Training of the region clustering tree is performed node by node, starting at a root node classifying the randomly selected subset of the set of image patches. At step 204, a classifier (e.g., feature) for a current node is selected that results in a classification of the image patches at that node that will best minimize the loss function for that tree. The loss function may be provided as in equation (1).

$$\text{Loss}(T) = \sum_{L \in T} \left( \sum_{v \in V} \left( \frac{1}{|P[v, L]|} \sum_{Q \in P[v,L]} (x(Q) - m)^2 \right) \right) \quad (1)$$

$$m = \frac{1}{|P[v, L]|} \sum_{Q \in P[v,L]} x(Q)$$

where T is a trained region clustering tree, L is a leaf node in T, P[v,L] is an observed set of patches from the $v^{th}$ training medical image classified to leaf L. The loss function of equation (1) represents a measure of how compact the group of patches corresponding to each leaf node is. Ideally, the patches falling into each leaf node should be spatially close if they belong to the same volume. This way, the prediction (such as landmark detection, bone segmentation, etc.) made by the trained region clustering tree (the detail of prediction is described later) is more consistent. This is because each patch falling into the end lead node will cast its own prediction vote; pooling all these votes together constitute the final prediction.

At step 206, image patches at the current node are sorted (e.g., classified) using the classifier selected at step 204 into a plurality of child nodes of the current node. For example, the image patches at a root node may be sorted into one of two child nodes. At step 208, steps 204 and 206 are recursively repeated for all resulting child nodes until one or more stopping criteria are satisfied. For example, the stopping criteria may include a maximum depth of the region clustering tree (e.g., depth of 10). Other stopping criteria are also contemplated. At step 210, a trained region clustering tree is output. The trained region clustering tree includes leaf nodes associated with spatially localized regions of the image.

Method 200 of FIG. 2 is repeated to train each of the plurality of region clustering trees. Returning to FIG. 1, at step 108, the plurality of trained region clustering trees is output as the region clustering forest. Since each region clustering tree is trained from a different (e.g., randomly) selected subset of the set of image patches, each trained region clustering tree provides a different approximation of a minimization of the loss function.

Advantageously, the trained region clustering forest may be used in an online stage for many different applications in medical imaging analysis. For example, the trained region clustering forest may be used in an online stage for landmark detection, registration, super voxels, approximate nearest neighbors, tracking, classification, one-class learning, lesion detection, and as machine learning features. Other applications of the trained region clustering forest are also contemplated.

In one embodiment, the trained region clustering forest may be used for landmark detection. In this embodiment, the trained region clustering forest is trained in an offline training stage with training data annotated with known landmark locations, e.g., using method 100 of FIG. 1 and method 200 of FIG. 2. The known landmark locations in the training data are used to calculate offset vectors associated with each image patch. An offset vectors represents a distance and direction that an image patch is offset from a landmark location. For example, the offset vectors may be calculated between, e.g., a center of each image patch and a location of each landmark.

An offset vector may be associated with each respective leaf node of each region clustering tree based on the offset vectors for image patches sorted to the respective leaf node. For example, the offset vector associated with each leaf node may be computed in the offline training stage by computing the mean offset vector of every image patch sorted to the respective leaf node, by computing the median offset of every image patch sorted to the respective leaf node to account for outliers, by clustering (e.g., k-means, expectation-maximization (EM), mean-shift, etc.) every image patch in the training set sorted to the respective leaf node to find the k best predictions to help deal with outliers, or by any other suitable method. Once the region clustering forest is trained with leaf nodes associated with offset vectors, the trained region clustering forest may be used in an online stage for landmark detection.

Figure 3:
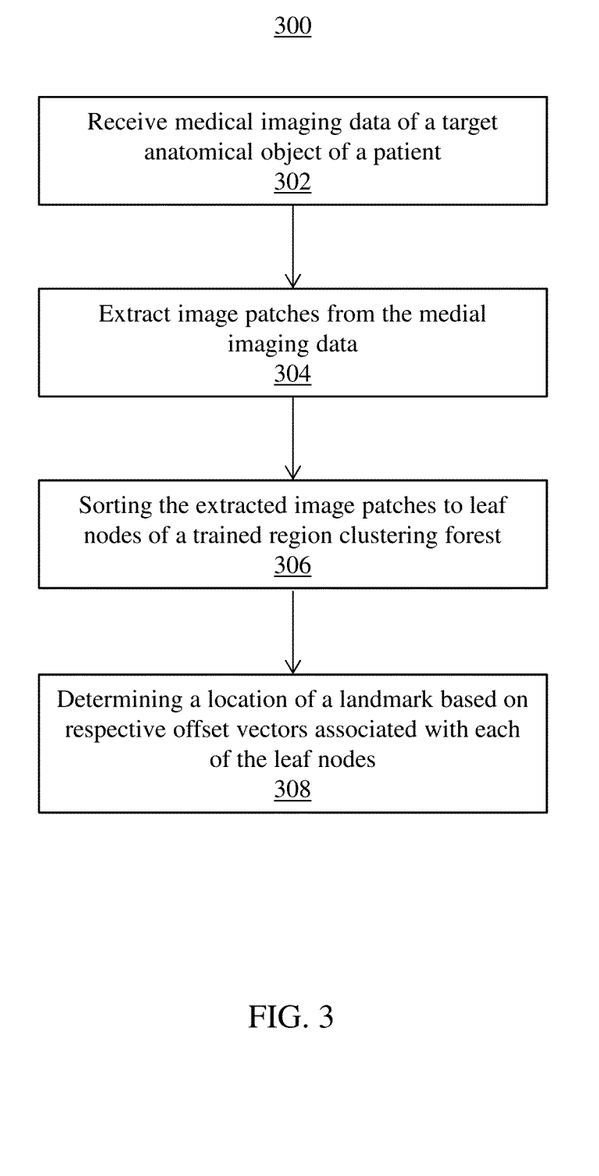
FIG. 3 shows a method for landmark detection using a trained region clustering forest in an online stage, in accordance with one embodiment.

FIG. 3 shows a method for landmark detection using a trained region clustering forest in an online stage, in accordance with one or more embodiments. At step 302, medical imaging data of a target anatomical object of a subject (e.g., patient) is received. The medical imaging data may include images or frames acquired from an image acquisition device. In one embodiment, the medical imaging data is three-dimensional (3D) volumetric imaging data. The image acquisition device may be of any modality, such as, e.g., CT, MR, ultrasound, x-ray, etc. In one embodiment, the medical imaging data is received directly from the image acquisition device imaging the patient. In another embodiment, the medical imaging data is received by loading previously stored imaging data of the patient.

At step 304, images patches are extracted from the medical imaging data. Each image patch corresponds to a spatially localized region of the medical imaging data centered at a voxel located at X. For example, the image patches may be extracted every n voxels of the medical imaging data (e.g., n=1), to provide complete coverage of the medical imaging data without overlapping, or any other suitable approach. The image patches may be of any size or shape. In some embodiments, the extracted image patches are high dimensional feature spaces, such as, e.g., Haar features. Other suitable image features may also be employed.

At step 306, the extracted image patches are sorted to a respective leaf node for each region clustering tree of a trained region clustering forest. The trained region clustering forest may be trained in an offline training stage using, e.g., method 100 of FIG. 1 and method 200 of FIG. 2. In one advantageous embodiment, the trained region clustering forest is trained to minimize the loss function of equation (1) representing a measure of how compact the group of patches corresponding to each leaf node is. Each leaf node of each region clustering tree is associated with an offset vector DX in the offline training stage.

At step 308, a location of a landmark is determined based on one or more of the respective image patches which are centered at voxel X and respective offset vectors DX associated with leaf nodes that the respective image patches were sorted to for each of the plurality of region clustering trees. For example, the location of the landmark may be determined based on a center voxel location X of a respective image patch combined with a respective offset vector DX associated with a leaf node that the respective image patch was sorted to (i.e., X+DX).

In one embodiment, a location of a landmark may be determined using each of the extracted image patches and each of the plurality of region clustering trees. For example, a predicted location of the landmark may be determined for each of the plurality of region clustering trees and the predicted location of the landmark for each of the plurality of region clustering trees may be aggregated (e.g., averaged) to determine the location of the landmark. In another example, a predicted location of a landmark may be determined for each of the extracted image patches and the predicted location of the landmark for each extracted image patch is aggregated to determine the location of the landmark. In a further example, predicted locations of the landmark may be determined for each individual extracted image patch evaluated for each individual region clustering tree and all predictions are aggregated to determine the location of the landmark. Other suitable form of aggregating may also be employed.

Figure 4:
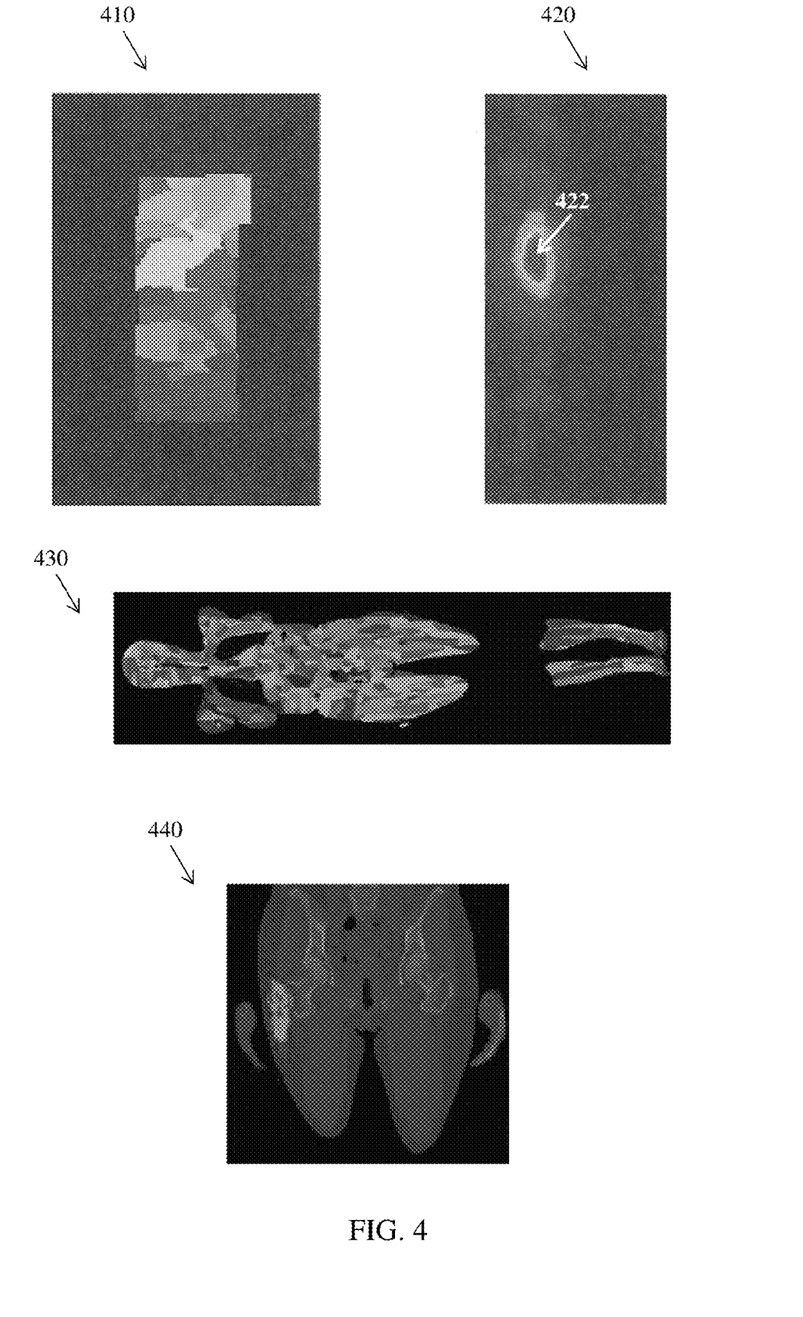
FIG. 4 shows a map of an anatomical object generated using a trained region clustering tree, in accordance with one embodiment.

FIG. 4 illustratively shows a map of an anatomical object generated using a trained region clustering forest, in accordance with one or more embodiments. Image 410 shows a partition map of leaf nodes using a trained region clustering tree. Image patches are passed down the trained region clustering tree for partitioning into a leaf node. Image patches of a same leaf node are shown in image 410, e.g., with a same color (however leaf nodes may also share colors). Image 420 shows a landmark voting map generated using a trained region clustering tree for landmark detection. A landmark is shown according to a quantity of votes associated with each of the extracted image patches, which may be represented by color. Region 422 in image 420 is shown having a highest number of votes. Image 430 shows a leaf map from a trained region clustering tree. As seen in image 430, leaf nodes generally describe relatively localized region in an image, leading to higher quality predictions. Image 440 shows voting maps for a landmark. Voxels with 10 or more votes are colored. More image patches vote using the trained region clustering tree than other known methods. It should be understood that other visual differentiators (e.g., shading) may also be used in images 410, 420, 430, and 440.

In another embodiment, the trained region clustering forest may be used as a feature in a machine learning framework, such as, e.g., for bone segmentation. Bone segmentation may be challenging in images having similarly contrasted structures such as vessels and intestines. Spatial information has shown to improve bone segmentation performance, however spatial information typically involves a landmark detector, which may mispredict or fail for some landmarks.

A trained region clustering forest may be trained for bone segmentation in an offline training stage with training data annotated with bone location information using, e.g., method 100 of FIG. 1 and method 200 of FIG. 2. Due to the region clustering forest's spatial property, image patches in a leaf node are likely to correspond to spatially localized regions of an image. As such, each leaf node in the trained region clustering forest may correspond with a label of bone classification. For example, a leaf node may correspond to a label indicating regions where bone is always absent, regions where bone is almost always present, etc.

Figure 5:
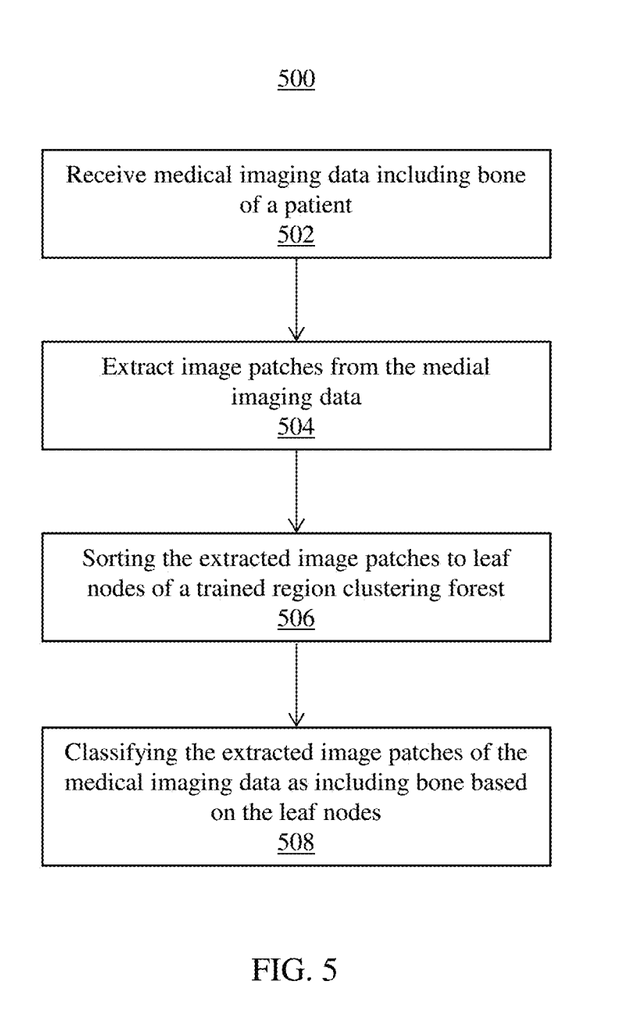
FIG. 5 shows a method for bone classification using a trained region clustering forest in an online stage, in accordance with one embodiment.

FIG. 5 shows a method for bone classification using a trained region clustering forest in an online stage, in accordance with one or more embodiments. At step 502, medical imaging data including bone of a patient is received. The medical imaging data may include 3D volumetric imaging data and may be of any modality. At step 504, image patches are extracted from the medical imaging data. For example, a respective image patch centered at each voxel can be extracted from the medical imaging data. At step 506, the extracted image patches are sorted to leaf nodes of each region clustering tree of a trained region clustering forest, e.g., using method 100 of FIG. 1 and method 200 of FIG. 2. The trained region clustering forest may be trained to minimize the loss function of equation (1) representing a measure of how compact the group of patches corresponding to each leaf node is. Each leaf node may be associated with a label during the training stage that indicates a bone presence (e.g., bone is present, bone is not present, etc.). At step 508, the extracted image patches of the medical imaging data are classified as including bone based on the leaf nodes. In some embodiments, a trained bone voxel classifier may then be employed to only classify image patches associated with leaf nodes that indicate bone is present.

In other embodiments, the trained region clustering forest may be used for registering medical imaging data with an atlas. Based on the trained region clustering forest's spatial property, each leaf can be effectively associated with a region in an atlas. In a first stage, an atlas of a target anatomical object is annotated with labels identifying regions or objects. The atlas is evaluated on a trained region clustering forest, e.g., using method 100 of FIG. 1 and method 200 of FIG. 2 to minimize the loss function of equation (1) representing a measure of how compact the group of patches corresponding to each leaf node is. For example, image patches may be extracted from the atlas and each extracted image patch may be sorted to leaf nodes of each region clustering tree of the trained region clustering forest. Each leaf node index is mapped to voxel positions (of the respective sorted extracted image patches) in the atlas to form a multi-label atlas leaf index mask using the corresponding annotated atlas labels. There may be one multi-label atlas leaf index mask for each region clustering tree in the train region clustering forest. Overlaying the multi-label atlas leaf index mask over the atlas volume describes the regions of the atlas the trained region clustering forest predicts.

In a second stage, for an unseen case, registration is performed by evaluating medical imaging data over the trained region clustering forest. Specifically, image patches are extracted from the medical imaging data and sorted to respective leaf nodes of each region clustering tree. For each voxel (i.e., extracted image patch) of the medical imaging data, a label is assigned based on the atlas label associated with the corresponding leaf node. Results of several leaf nodes from different region clustering trees may be aggregated.

Advantageously, the trained region clustering forest may also be used for a number of other applications for the analysis of medical imaging data. For example, the trained region clustering forest may be used for tracking purposes by considering the target range to be motion vectors. In another example, the trained region clustering forest may be used for one class learning to form a codebook that describes positive examples while ignoring negative examples given a sufficient number of samples. Such a codebook can be useful in situation where few negatives are available or the negatives are too diverse to learn. In some embodiments, the trained region clustering forest may be generalized to multi-class classification. In other examples, the trained region clustering forest may be used to form super pixels. The leaf nodes describe spatially localized regions of an image. These regions may be treated as a type of super pixel. Super pixels can be used as a primitive for segmentation.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 1-3 and 5. Certain steps of the methods described herein, including one or more of the steps of FIGS. 1-3 and 5, may be performed by a server or by another processor in a network-based cloud-computing system. Certain steps of the methods described herein, including one or more of the steps of FIGS. 1-3 and 5, may be performed by a client computer in a network-based cloud computing system. The steps of the methods described herein, including one or more of the steps of FIGS. 1-3 and 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 1-3 and 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
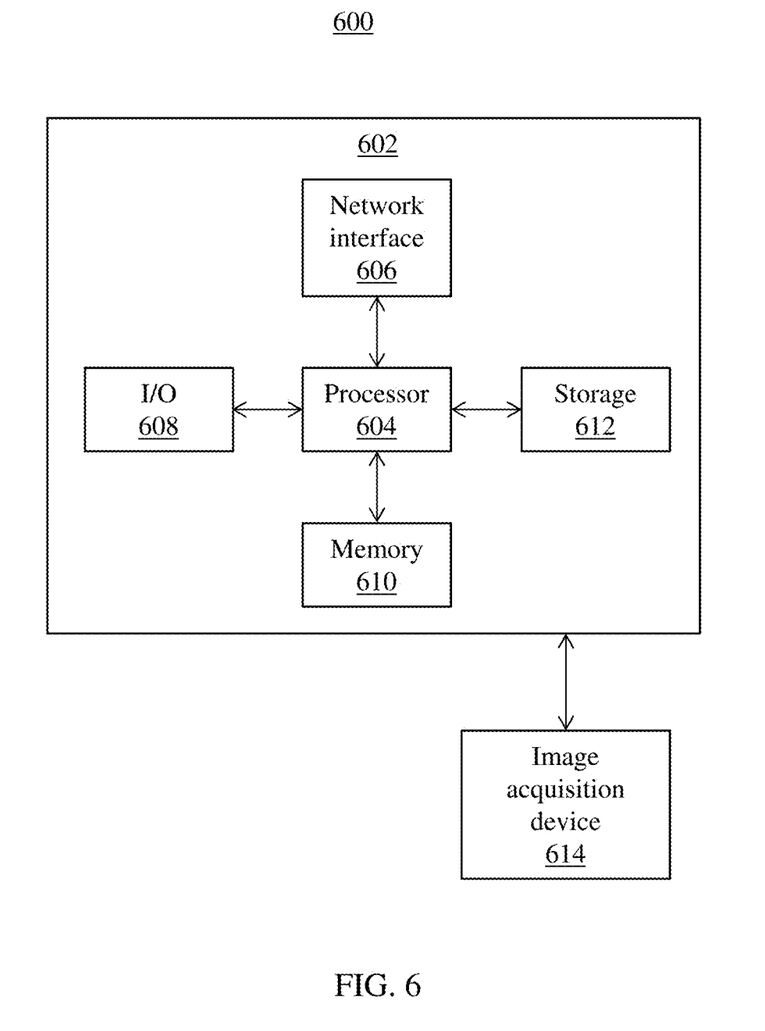
FIG. 6 shows a high-level block diagram of a computer for training a region clustering tree in an offline training stage and performing analysis (e.g., landmark detection, bone segmentation, registration, etc.) on medical imaging data in an online stage, in accordance with one embodiment.

A high-level block diagram 600 of an example computer that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method steps of FIGS. 1-3 and 5 can be defined by the computer program instructions stored in memory 610 and/or data storage device 612 and controlled by processor 604 executing the computer program instructions. For example, the computer program instructions can be implemented as computer executable code programmed by one skilled in the art to perform the method steps of FIGS. 1-3 and 5. Accordingly, by executing the computer program instructions, the processor 404 executes the method steps of FIGS. 1-3 and 5. An image acquisition device 614, such as a CT scanning device, C-arm image acquisition device, MR scanning device, Ultrasound device, etc., can be connected to the computer 602 to input image data to the computer 602. It is possible to implement the image acquisition device 614 and the computer 602 as one device. It is also possible that the image acquisition device 612 and the computer 602 communicate wirelessly through a network. Computer 604 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 680 may include a display device such as a cathode ray tube (CRT) or liquid crystal display (LCD) monitor for displaying information to the user, a keyboard, and a pointing device such as a mouse or a trackball by which the user can provide input to computer 602.

Any or all of the systems and apparatus discussed herein, may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for training a region clustering forest, comprising:
    receiving a set of medical training images for a population of patients;
    extracting a set of image patches from each image in the set of medical training images; and
    generating a plurality of region clustering trees each minimizing a loss function based on respective randomly selected subsets of the set of image patches to train the region clustering forest, wherein each of the plurality of region clustering trees cluster image patches at a plurality of leaf nodes and the loss function measures a compactness of the cluster of image patches at each leaf node in each of the plurality of region clustering trees.

2. The method as recited in claim 1, wherein extracting a set of image patches from each image in the set of medical training images comprises:
    extracting image patches centered around every n voxels in each image of the set of medical training images, where n is any positive integer.

3. The method as recited in claim 1, wherein generating a plurality of region clustering trees each minimizing a loss function based on respective randomly selected subsets of the set of image patches to train the region clustering forest comprises:
    for each region clustering tree of the plurality of region clustering trees:
        randomly selecting a respective subset of the set of image patches at a root node of the respective region clustering tree;
        selecting a classifier for a current node of the respective region clustering tree resulting in a classification of image patches at the current node that minimizes the loss function for the respective region clustering tree;
        sorting image patches at the current node using the selected classifier into a plurality of child nodes of the current node; and
        repeating the selecting the classifier and the sorting for all resulting child nodes until a stopping criterion is satisfied.

4. The method as recited in claim 3, wherein repeating the selecting the classifier and the sorting for all resulting child nodes until a stopping criterion is satisfied comprises:
    repeating the selecting the classifier and the sorting until a predetermined maximum depth of the respective region clustering tree is reached.

5. The method as recited in claim 1, wherein generating a plurality of region clustering trees each minimizing a loss function based on respective randomly selected subsets of the set of image patches to train the region clustering forest comprises:
    generating each of the plurality of region clustering trees to generate different minimizations of the loss function based on the respective randomly selected subsets.

6. The method as recited in claim 1, further comprising:
    determining offset vectors between a center of each image patch in the set of image patches and a known location of a landmark in the set of medical training images; and
    computing an associated offset vector for each respective leaf node of each of the plurality of region clustering trees based on the determined offset vectors for image patches sorted to the respective leaf node.

7. The method as recited in claim 6, wherein computing an associated offset vector for each respective leaf node of each of the plurality of region clustering trees based on the determined offset vectors for image patches sorted to the respective leaf node comprises at least one of:
    computing the associated offset vector for each respective leaf node as a mean of the determined offset vectors for image patches sorted to the respective leaf node;

computing the associated offset vector for each respective leaf node as a median of the determined offset vectors for image patches sorted to the respective leaf node; and computing the associated offset vector for each respective leaf node by machine-learning based clustering of the determined offset vectors for image patches sorted to the respective leaf node.

8. The method as recited in claim 6, further comprising:
extracting patches from medical imaging data including a landmark of a patient;
sorting the extracted patches to a respective one of the leaf nodes for each of the plurality of region clustering trees of the trained region clustering forest; and
determining a location of the landmark based on the associated offset vectors associated with the respective one of the leaf nodes that the extracted patches were sorted to.

9. The method as recited in claim 1, wherein generating a plurality of region clustering trees each minimizing a loss function based on respective randomly selected subsets of the set of image patches to train the region clustering forest comprises:
associating a label with each leaf node of each of the plurality of region clustering trees indicating a presence of bone based on annotations in the medical training images.

10. The method as recited in claim 9, further comprising:
extracting patches from medical imaging data including bone of a patient;
sorting the extracted patches to a respective one of the leaf nodes for each of the plurality of region clustering trees of the trained region clustering forest; and
determining whether the extracted patches include the bone based on the label associated with the respective one of the leaf nodes that the extracted patches were sorted to.

11. The method as recited in claim 1, further comprising:
annotating an atlas of a target anatomical object with atlas labels;
extracting atlas patches from the atlas;
sorting the extracted atlas patches to a respective one of the leaf nodes for each of the plurality of region clustering trees of the trained region clustering forest; and
associating an index of the respective one of the leaf nodes to voxel positions in the atlas associated with extracted atlas patches sorted to the respective one of the leaf nodes.

12. The method as recited in claim 11, further comprising:
extracting patches from medical imaging data including the target anatomical object of a patient;
sorting the extracted patches to another respective one of the leaf nodes for each of the plurality of region clustering trees of the trained region clustering forest; and
assigning labels to voxels associated with the extracted patches based on the atlas labels associated with the index of the leaf nodes that the extracted patches were sorted to.

13. An apparatus for training a region clustering forest, comprising:
means for receiving a set of medical training images for a population of patients;
means for extracting a set of image patches from each image in the set of medical training images; and means for generating a plurality of region clustering trees each minimizing a loss function based on respective randomly selected subsets of the set of image patches to train the region clustering forest, wherein each of the plurality of region clustering trees cluster image patches at a plurality of leaf nodes and the loss function measures a compactness of the cluster of image patches at each leaf node in each of the plurality of region clustering trees.

14. The apparatus as recited in claim 13, wherein the means for extracting a set of image patches from each image in the set of medical training images comprises:
means for extracting image patches centered around every n voxels in each image of the set of medical training images, where n is any positive integer.

15. The apparatus as recited in claim 13, wherein the means for generating a plurality of region clustering trees each minimizing a loss function based on respective randomly selected subsets of the set of image patches to train the region clustering forest comprises:
for each region clustering tree of the plurality of region clustering trees:
means for randomly selecting a respective subset of the set of image patches at a root node of the respective region clustering tree;
means for selecting a classifier for a current node of the respective region clustering tree resulting in a classification of image patches at the current node that minimizes the loss function for the respective region clustering tree;
means for sorting image patches at the current node using the selected classifier into a plurality of child nodes of the current node; and
means for repeating the selecting the classifier and the sorting for all resulting child nodes until a stopping criterion is satisfied.

16. The apparatus as recited in claim 13, wherein the means for generating a plurality of region clustering trees each minimizing a loss function based on respective randomly selected subsets of the set of image patches to train the region clustering forest comprises:
means for generating each of the plurality of region clustering trees to generate different minimizations of the loss function based on the respective randomly selected subsets.

17. The apparatus as recited in claim 13, further comprising:
means for determining offset vectors between a center of each image patch in the set of image patches and a known location of a landmark in the set of medical training images; and
means for computing an associated offset vector for each respective leaf node of each of the plurality of region clustering trees based on the determined offset vectors for image patches sorted to the respective leaf node.

18. The apparatus as recited in claim 17, wherein the means for computing an associated offset vector for each respective leaf node of each of the plurality of region clustering trees based on the determined offset vectors for image patches sorted to the respective leaf node comprises at least one of:
means for computing the associated offset vector for each respective leaf node as a mean of the determined offset vectors for image patches sorted to the respective leaf node;

means for computing the associated offset vector for each respective leaf node as a median of the determined offset vectors for image patches sorted to the respective leaf node; and means for computing the associated offset vector for each respective leaf node by machine-learning based clustering of the determined offset vectors for image patches sorted to the respective leaf node.

19. The apparatus as recited in claim 17, further comprising:

means for extracting patches from medical imaging data including a landmark of a patient;

means for sorting the extracted patches to a respective one of the leaf nodes for each of the plurality of region clustering trees of the trained region clustering forest; and means for determining a location of the landmark based on the associated offset vectors associated with the respective one of the leaf nodes that the extracted patches were sorted to.

20. A non-transitory computer readable medium storing computer program instructions for training a region clustering forest, the computer program instructions when executed by a processor cause the processor to perform operations comprising:

receiving a set of medical training images for a population of patients;

extracting a set of image patches from each image in the set of medical training images; and generating a plurality of region clustering trees each minimizing a loss function based on respective randomly selected subsets of the set of image patches to train the region clustering forest, wherein each of the plurality of region clustering trees cluster image patches at a plurality of leaf nodes and the loss function measures a compactness of the cluster of image patches at each leaf node in each of the plurality of region clustering trees.

21. The non-transitory computer readable medium as recited in claim 20, wherein extracting a set of image patches from each image in the set of medical training images comprises:

extracting image patches centered around every n voxels in each image of the set of medical training images, where n is any positive integer.

22. The non-transitory computer readable medium as recited in claim 20, wherein generating a plurality of region clustering trees each minimizing a loss function based on respective randomly selected subsets of the set of image patches to train the region clustering forest comprises:

for each region clustering tree of the plurality of region clustering trees:

randomly selecting a respective subset of the set of image patches at a root node of the respective region clustering tree;

selecting a classifier for a current node of the respective region clustering tree resulting in a classification of image patches at the current node that minimizes the loss function for the respective region clustering tree;

sorting image patches at the current node using the selected classifier into a plurality of child nodes of the current node; and repeating the selecting the classifier and the sorting for all resulting child nodes until a stopping criterion is satisfied.

23. The non-transitory computer readable medium as recited in claim 20, wherein generating a plurality of region clustering trees each minimizing a loss function based on respective randomly selected subsets of the set of image patches to train the region clustering forest comprises:

generating each of the plurality of region clustering trees to generate different minimizations of the loss function based on the respective randomly selected subsets.

24. The non-transitory computer readable medium as recited in claim 20, the operations further comprising:

determining offset vectors between a center of each image patch in the set of image patches and a known location of a landmark in the set of medical training images; and computing an associated offset vector for each respective leaf node of each of the plurality of region clustering trees based on the determined offset vectors for image patches sorted to the respective leaf node.

25. The non-transitory computer readable medium as recited in claim 24, the operations further comprising:

extracting patches from medical imaging data including a landmark of a patient;

sorting the extracted patches to a respective one of the leaf nodes for each of the plurality of region clustering trees of the trained region clustering forest; and determining a location of the landmark based on the associated offset vectors associated with the respective one of the leaf nodes that the extracted patches were sorted to.

* * * * *